(12) United States Patent
Joo et al.

(10) Patent No.: US 7,245,105 B2
(45) Date of Patent: Jul. 17, 2007

(54) SINGLE-PHASE INDUCTION MOTOR AND METHOD FOR REDUCING NOISE IN THE SAME

(75) Inventors: Jae Man Joo, Suwon-Si (KR); Jun Hwa Lee, Anyang-Si (KR); Seung Gee Hong, Yongin-Si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 0 days.

(21) Appl. No.: 11/226,213

(22) Filed: Sep. 15, 2005

(65) Prior Publication Data

US 2006/0103340 A1 May 18, 2006

(30) Foreign Application Priority Data

Nov. 17, 2004 (KR) ............. 10-2004-0094349

(51) Int. Cl.
H02P 23/00 (2006.01)
(52) U.S. Cl. .............. 318/720; 318/724; 318/738; 318/748; 318/749; 318/751; 318/768
(58) Field of Classification Search ............... None
See application file for complete search history.

(56) References Cited

U.S. PATENT DOCUMENTS

| | | | | |
|---|---|---|---|---|
| 1,894,804 A * | 1/1933 | Weichsel | ............. | 318/794 |
| 1,944,090 A * | 1/1934 | Lukens | ............. | 318/795 |
| 2,034,950 A * | 3/1936 | Lyden | ............. | 318/795 |
| 3,760,247 A * | 9/1973 | Trouilhet | ............. | 318/797 |
| 3,970,908 A * | 7/1976 | Hansen et al. | ............. | 318/786 |
| 4,060,754 A * | 11/1977 | Kirtley et al. | ............. | 318/768 |
| 4,100,444 A * | 7/1978 | Boyd, Jr. | ............. | 310/184 |
| 4,156,821 A * | 5/1979 | Kurome et al. | ............. | 310/166 |
| 4,401,933 A * | 8/1983 | Davy et al. | ............. | 318/778 |
| 4,442,368 A * | 4/1984 | Kupisiewicz et al. | ...... | 310/201 |
| 4,465,962 A * | 8/1984 | Kirschbaum | ............. | 318/817 |
| 4,520,303 A * | 5/1985 | Ward | ............. | 318/778 |
| 4,651,079 A * | 3/1987 | Wills | ............. | 318/811 |
| 4,658,195 A * | 4/1987 | Min | ............. | 318/786 |
| 4,672,284 A * | 6/1987 | Ward | ............. | 318/752 |

(Continued)

FOREIGN PATENT DOCUMENTS

JP 09-131029 5/1997

(Continued)

Primary Examiner—Lincoln Donovan
Assistant Examiner—Robert W. Horn
(74) Attorney, Agent, or Firm—Staas & Halsey LLP

(57) ABSTRACT

A single-phase induction motor and a method for reducing noise in the same, which can eliminate unbalance between magnetomotive forces of main and auxiliary windings in a stator of the motor, thereby implementing a low noise, low vibration motor, and can also achieve balance between the magnetomotive forces of the stator windings in the entire running range of the motor, and can further achieve balance between the magnetomotive forces of the stator windings on the basis of temperature increase of the motor as it runs. The amplitude of a main-winding current flowing through the main winding in the stator is controlled to be equal to the amplitude of an auxiliary-winding current flowing through the auxiliary winding in the stator, and the phase difference between the main-winding and auxiliary-winding currents is controlled to be maintained at a predetermined value.

10 Claims, 8 Drawing Sheets

U.S. PATENT DOCUMENTS

| | | | | |
|---|---|---|---|---|
| 4,792,740 A | * | 12/1988 | Smith | 318/768 |
| 4,820,964 A | * | 4/1989 | Kadah et al. | 318/786 |
| 4,843,295 A | * | 6/1989 | Thompson et al. | 318/786 |
| 4,862,053 A | * | 8/1989 | Jordan et al. | 318/786 |
| 5,136,216 A | * | 8/1992 | Wills et al. | 318/123 |
| 5,146,147 A | * | 9/1992 | Wills et al. | 318/797 |
| 5,159,255 A | * | 10/1992 | Weber | 318/775 |
| 5,218,283 A | * | 6/1993 | Wills et al. | 318/748 |
| 5,252,905 A | * | 10/1993 | Wills et al. | 318/807 |
| 5,345,126 A | * | 9/1994 | Bunch | 310/68 C |
| 5,391,971 A | * | 2/1995 | Yamada et al. | 318/778 |
| 5,483,139 A | * | 1/1996 | Welles, II | 318/782 |
| 5,589,753 A | * | 12/1996 | Kadah et al. | 318/785 |
| 5,650,697 A | * | 7/1997 | Imagi et al. | 318/254 |
| 5,696,432 A | * | 12/1997 | Poeppel | 318/732 |
| 5,796,234 A | * | 8/1998 | Vrionis | 318/751 |
| 5,811,955 A | * | 9/1998 | Kachuk | 318/786 |
| 5,861,697 A | * | 1/1999 | Sugita et al. | 310/166 |
| 5,867,005 A | * | 2/1999 | Brown | 318/751 |
| 5,973,473 A | * | 10/1999 | Anderson et al. | 318/785 |
| 6,020,725 A | | 2/2000 | Roberts | 322/90 |
| 6,051,952 A | * | 4/2000 | Moreira et al. | 318/738 |
| 6,121,749 A | * | 9/2000 | Wills et al. | 318/811 |
| 6,160,697 A | * | 12/2000 | Edel | 361/143 |
| 6,208,113 B1 | * | 3/2001 | Lelkes et al. | 318/807 |
| 6,255,755 B1 | * | 7/2001 | Fei | 310/184 |
| 6,271,639 B1 | * | 8/2001 | Fei | 318/524 |
| 6,320,348 B1 | * | 11/2001 | Kadah | 318/785 |
| 6,329,783 B1 | * | 12/2001 | Vrionis et al. | 318/772 |
| 6,570,778 B2 | * | 5/2003 | Lipo et al. | 363/41 |
| 6,700,333 B1 | * | 3/2004 | Hirshi et al. | 315/291 |
| 6,713,986 B1 | * | 3/2004 | Jayadev et al. | 318/753 |
| 6,747,428 B1 | * | 6/2004 | Kwon et al. | 318/434 |
| 6,847,183 B2 | * | 1/2005 | Marioni | 318/700 |
| 6,930,464 B2 | * | 8/2005 | Han et al. | 318/781 |
| 6,952,088 B2 | * | 10/2005 | Woodward et al. | 318/430 |
| 6,959,706 B2 | * | 11/2005 | Brandt | 126/299 R |
| 6,969,969 B2 | * | 11/2005 | Weinmann | 318/811 |
| 6,984,979 B1 | * | 1/2006 | Edel | 324/253 |
| 6,989,649 B2 | * | 1/2006 | Mehlhorn | 318/806 |
| 2005/0253549 A1 | * | 11/2005 | Min et al. | 318/749 |
| 2006/0103340 A1 | * | 5/2006 | Joo et al. | 318/629 |

FOREIGN PATENT DOCUMENTS

| | | |
|---|---|---|
| KR | 10-272126 | 8/2000 |

* cited by examiner

Fig 6

| PHASE DIFFERENCE (DEGREES) | AMPERE-TURN RATIO (AUXILIARY WINDING/MAIN WINDING) |
|---|---|
| 70 | 0.75~1.15 |
| 80 | 0.65~1.35 |
| 90 | 0.6~1.4 |
| 100 | 0.65~1.35 |
| 110 | 0.75~1.15 |

SINGLE-PHASE INDUCTION MOTOR AND METHOD FOR REDUCING NOISE IN THE SAME

CROSS-REFERENCE TO RELATED APPLICATIONS

This application claims the benefit of Korean Patent Application No. 10-2004-0094349, filed on Nov. 17, 2004 in the Korean Intellectual Property Office, the disclosure of which is incorporated herein by reference.

BACKGROUND OF THE INVENTION

1. Field of the Invention

The present invention relates to single-phase induction motors, and more particularly, to a single-phase induction motor and a method for reducing noise in the same, which minimize noise and vibration by balancing the magnetomotive forces of stator windings in the motor.

2. Description of the Related Art

A single-phase induction motor is a type of alternating current "AC" motor. The simplest configuration of the single-phase induction motor uses commercial power without alteration and includes a single-phase main winding provided in a stator and a squirrel-cage shaped conductor provided in a rotor. Since the motor is not rotated with commercial power alone, a shading coil is installed, or a split-phase coil or a capacitor is installed in an auxiliary coil to start the motor. Single-phase induction motors are classified based on their structure into capacitor split-phase motors, resistance split-phase motors, capacitor-run motors, shading-coil motors, and reactor motors.

Among the different types of single-phase induction motors, the capacitor-run motor has a main winding, an auxiliary winding connected in parallel with the main winding, and a capacitor connected in series with the auxiliary winding. The capacitor-run motor is started using the auxiliary winding and the capacitor. When in operation, the capacitor-run motor does not disconnect the auxiliary winding, but instead allows current to flow through the auxiliary winding so as to lag current flowing through the main winding by 90 degrees.

In the capacitor-run motor, the auxiliary winding is spatially displaced at 90 degrees to the main winding in the stator, and is electrically connected in parallel to the main winding. Current flowing through the main and auxiliary windings is split into two phases by causing an impedance difference between the main and auxiliary windings using the capacitor connected in series with the auxiliary winding. Correct phase splitting must be performed (i.e., complete phase equilibrium must be established) for the rotating magnetomotive force produced by the split-phase stator windings.

If incorrect phase splitting is performed, the rotating magnetomotive force rotates while rippling. If a ripple is present in the rotating magnetomotive force, torque ripple occurs in the rotor, causing noise and vibration in the motor.

The conventional single-phase induction motor controls its rotation speed through tap adjustment of the stator windings. In this conventional motor, even if phase equilibrium is established in a certain running range of the motor, the phase equilibrium is broken causing noise and vibration if a tap in the stator windings is switched to select a different running range.

In addition, even if phase equilibrium is established under a condition where no load is present, the phase equilibrium is broken under a condition where a load is present, due to characteristics of the single-phase induction motor, so that vibration and noise occurs in actual operation of the motor.

SUMMARY OF THE INVENTION

Therefore, it is an aspect of the invention to provide a single-phase induction motor and a method for reducing noise in the same, which can balance the magnetomotive forces of stator windings in the motor, thereby implementing a low noise, low vibration motor.

It is another aspect of the invention to provide a single-phase induction motor and a method for reducing noise in the same, which can achieve balance between magnetomotive forces of stator windings in the motor in the entire running range of the motor.

It is yet another aspect of the invention to provide a single-phase induction motor and a method for reducing noise in the same, which can achieve balance between magnetomotive forces of stator windings in the motor on the basis of temperature increase of the motor as it runs.

Additional aspects and/or advantages of the invention will be set forth in part in the description which follows and, in part, will be apparent from the description, or may be learned by practice of the invention.

In accordance with an aspect of the invention, there is provided a method for reducing noise in a single-phase induction motor, the method including performing a control operation so that the amplitude of a main-winding current flowing through a main winding in a stator is equal to the amplitude of an auxiliary-winding current flowing through an auxiliary winding in the stator, and so that phase difference between the main-winding and auxiliary-winding currents is maintained at a predetermined value.

The phase difference may be maintained at 90 degrees.

In accordance with another aspect of the invention, there is provided a method for reducing noise in a single-phase induction motor, the method including determining a main-winding magnetomotive force produced by a main winding in a stator and an auxiliary-winding magnetomotive force produced by an auxiliary winding in the stator; and controlling phase difference between a main-winding current flowing through the main winding and an auxiliary-winding current flowing through the auxiliary winding according to the determined main-winding and auxiliary-winding magnetomotive forces.

The phase difference may be controlled based on a ratio of the auxiliary-winding magnetomotive force to the main-winding magnetomotive force.

The phase difference may be controlled to be 70 or 110 degrees if the ratio is between 0.75 and 1.15.

The phase difference may be controlled to be 80 or 100 degrees if the ratio is between 0.65 and 1.35.

In accordance with still another aspect of the invention, there is provided a method for reducing noise in a single-phase induction motor, the method including performing a control operation so that a ratio of a backward magnetomotive force producing a backward rotating force in a stator to a main-winding magnetomotive force produced by a main winding in the stator is lower than a predetermined value.

The predetermined value may be 0.4.

In accordance with still another aspect of the invention, there is provided a single-phase induction motor including a main winding in a stator; an auxiliary winding in the stator, the auxiliary winding being connected in parallel with the main winding; and a controller for controlling phase difference between a main-winding current flowing through the main winding and an auxiliary-winding current flowing through the auxiliary winding according to a main-winding magnetomotive force produced by the main winding and an auxiliary-winding magnetomotive force produced by the auxiliary winding.

The controller may control the phase difference based on a ratio of the auxiliary-winding magnetomotive force to the main-winding magnetomotive force.

The controller may control the phase difference to be 70 or 110 degrees if the ratio is between 0.75 and 1.15.

The controller may control the phase difference to be 80 or 100 degrees if the ratio is between 0.65 and 1.35.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6 is a table showing design conditions of the single-phase induction motor shown in FIG. 1 according to the phase angle difference thereof.

DETAILED DESCRIPTION OF THE PREFERRED EMBODIMENTS

Figure 1:
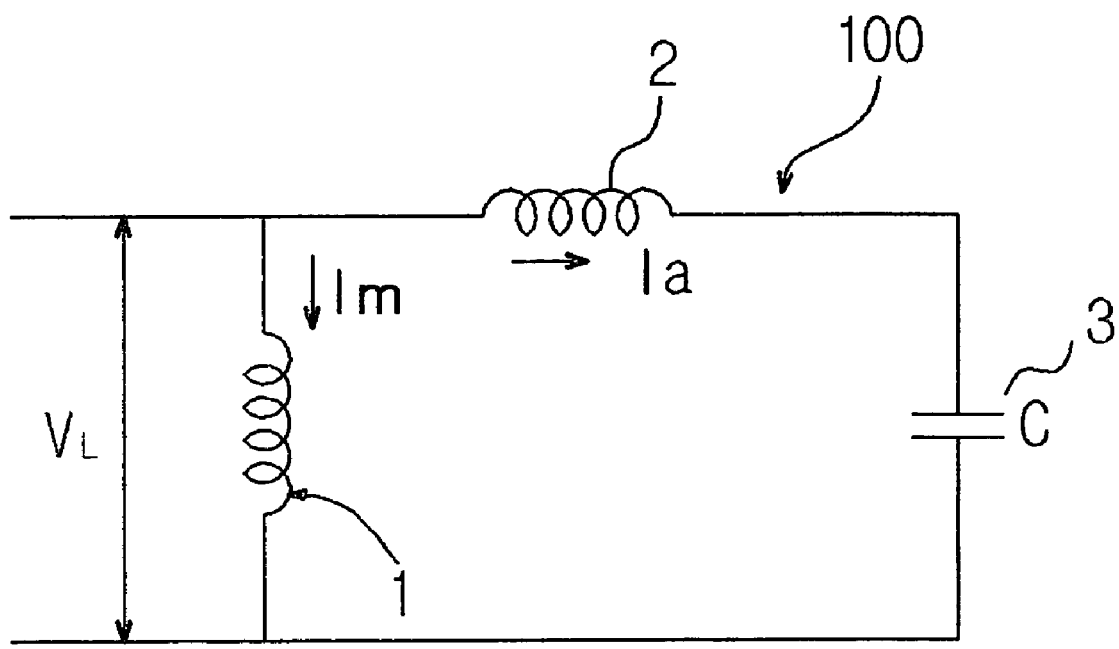
FIG. 1 is a circuit diagram of a capacitor-run single-phase induction motor according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

As shown in FIG. 1, the single-phase induction motor 100 according to the present invention is a capacitor-run motor in which a power source $V_L$ is connected to a main winding 1, an auxiliary winding 2 is connected in parallel to the main winding 1, and a capacitor 3 is connected in series to the auxiliary winding 2. Current flowing through the main and auxiliary windings 1 and 2 when the single-phase induction motor 100 starts producing magnetic fields inside the motor 100. The magnetic field produced by the main winding 1 induces a current in a rotor (not shown). The induced current produces another magnetic field in the rotor. A rotating magnetic field generated by the stator windings and the induced current flowing through the rotor produce a force therebetween, thereby rotating the rotor.

The capacitor 3 is needed to cause a phase difference between the magnetic field produced by the stator and the magnetic field produced by the rotor when the motor starts. The capacitor 3 functions to allow a current $I_a$ flowing through the auxiliary winding 2 to precede a current $I_m$ flowing through the main winding 1.

The capacitor-run single-phase induction motor 100 causes an impedance difference between the main and auxiliary windings 1 and 2 in the stator to split current flowing in the windings 1 and 2 into two phases, so that the split-phase stator windings produce a rotating magnetomotive force, thereby allowing the motor 100 to start and run.

The magnetomotive force produced by the stator windings in the single-phase induction motor 100 can be expressed by the following equation.

$$F(\theta, t) = F_f(\theta, t) + F_b(\theta, t) = \tag{1}$$

$$\frac{1}{\sqrt{2}}\{(N_m I_m + N_a I_a \sin\theta_a)\cos(\omega t - \theta) + (N_a I_a \cos\theta_a)\sin(\omega t - \theta)\} +$$

$$\frac{1}{\sqrt{2}}\{(N_m I_m - N_a I_a \sin\theta_a)\cos(\omega t + \theta) - (N_a I_a \cos\theta_a)\sin(\omega t + \theta)\}$$

In this equation, subscripts "m" and "a" denote values corresponding to the main and auxiliary windings 1 and 2, respectively, and "$\theta_a$" denotes a phase difference between the main and auxiliary windings 1 and 2. Also, "NI" denotes a magnetomotive force in ampere-turns, which is the product of the number of turns in a coil and a current, in amperes, flowing through the coil. "$N_m I_m$" and "$N_a I_a$" denote magnetomotive forces produced by the main and auxiliary windings 1 and 2, respectively. $F_f(\theta,t)$ denotes a forward magnetomotive force producing a forward rotating force, and $F_b(\theta,t)$ denotes a backward magnetomotive force producing a backward rotating force.

Figure 2A:
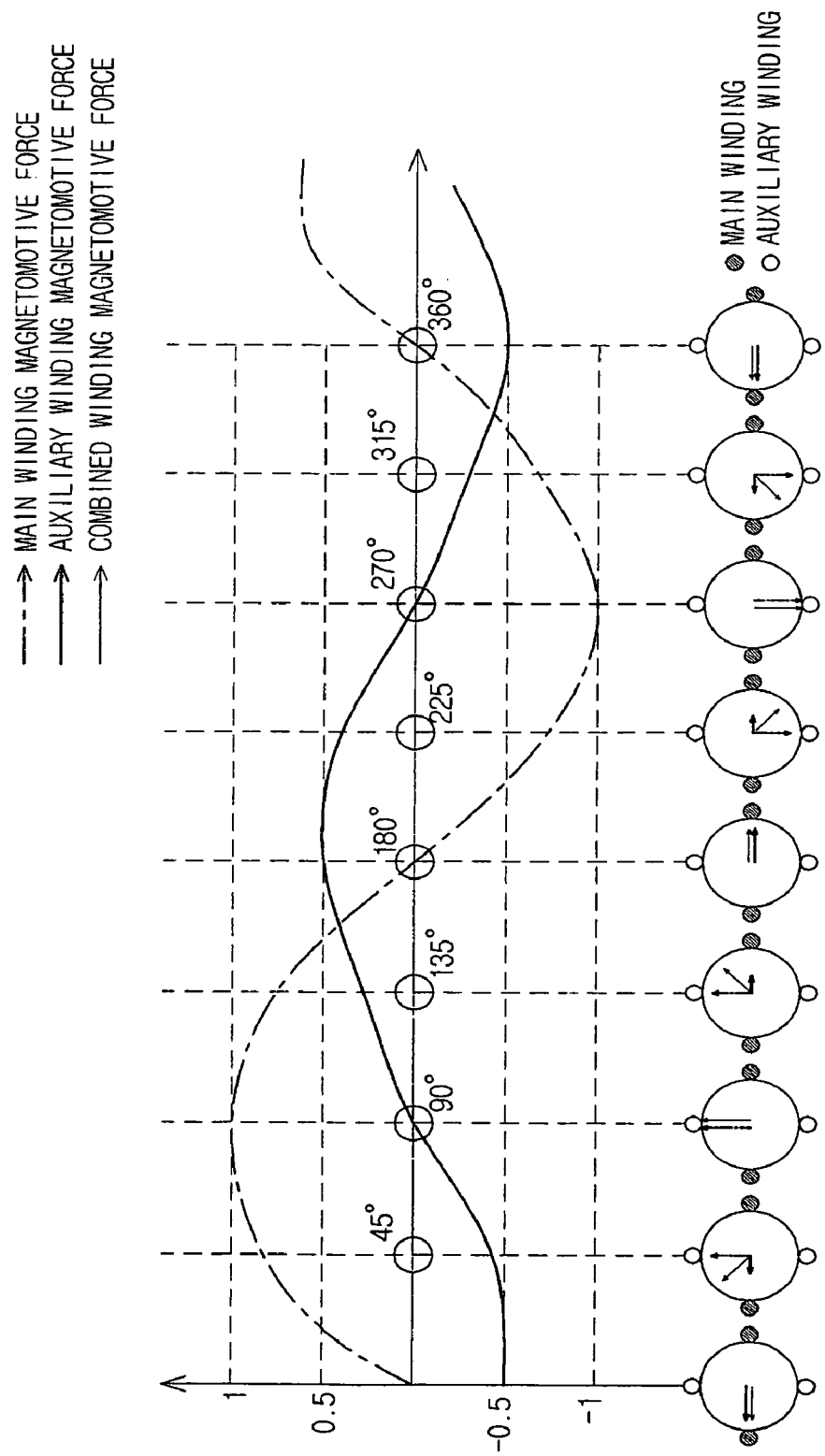
FIGS. 2A and 2B are diagrams illustrating the waveforms of currents flowing through main and auxiliary windings and a corresponding distribution of magnetomotive forces produced by the main and auxiliary windings, respectively, when phase equilibrium is broken in the single-phase induction motor shown in FIG. 1.
Figure 2B:
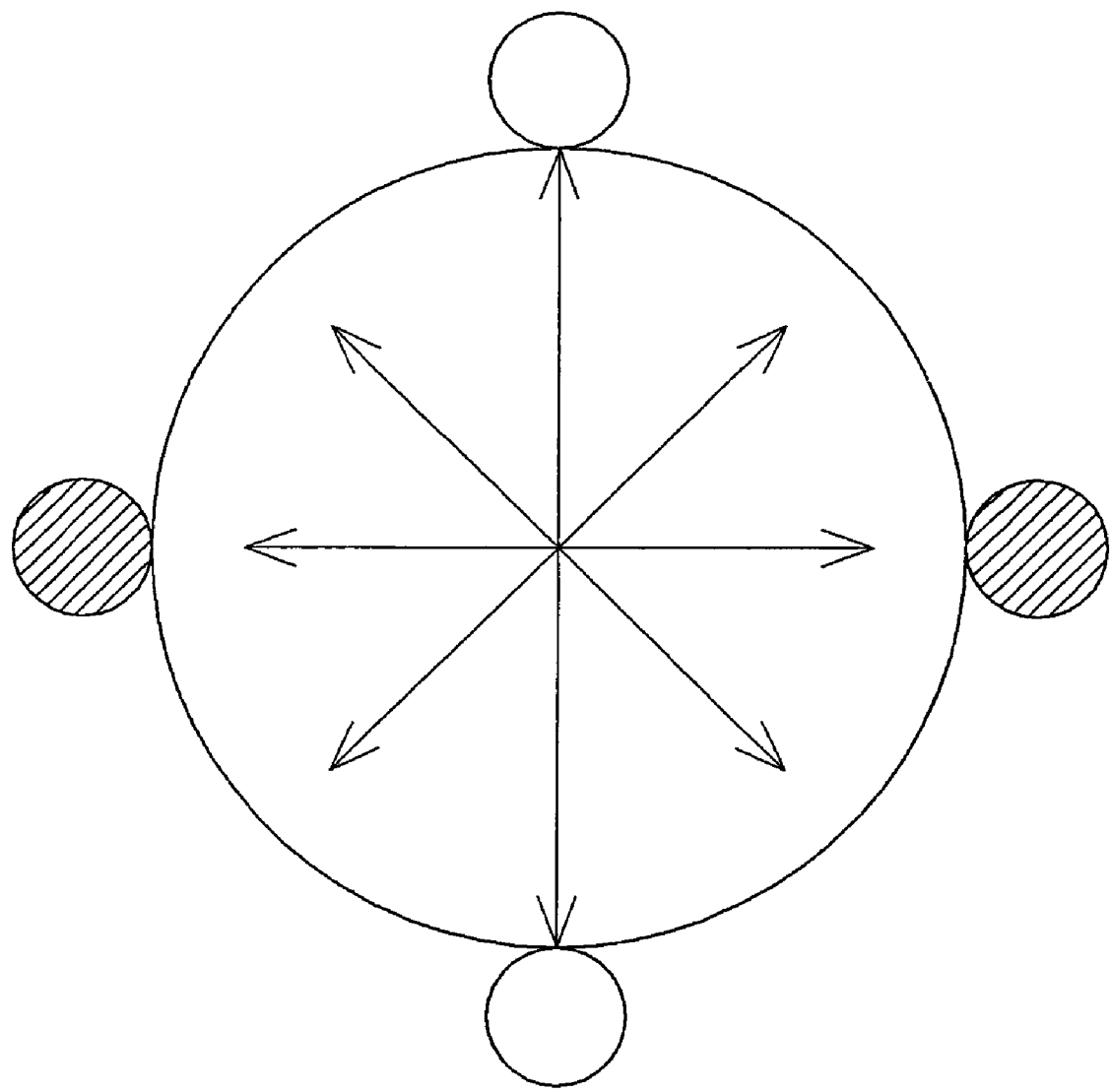

Torque ripple does not occur in the rotating magnetomotive force produced by the split-phase stator windings only when correct phase splitting is performed or complete phase equilibrium is established. FIGS. 2A and 2B show an example when phase equilibrium is broken in the single-phase induction motor. More specifically, FIG. 2A shows the waveforms of currents flowing through the main and auxiliary windings 1 and 2 and a corresponding distribution of magnetomotive forces produced by the main and auxiliary windings 1 and 2 when the ampere-turn of the main winding 1 is twice the ampere-turn of the auxiliary winding 2. In this example of FIG. 2A, the amplitude of the current flowing in the main winding 1 is twice that of the current flowing in the auxiliary winding 2, and the phase difference between the two currents is 90 degrees. When the current of the main winding 1 is zero in phase, only the current of the auxiliary winding 2 has a non-zero level of "−0.5", so that the combined magnetomotive force is equal to the magnetomotive force of the auxiliary winding 2, which has a level of "−0.5". When the current of the main winding 1 is 90 degrees in phase, only the current of the main winding 1 has a non-zero level of "+1", so that the combined magnetomotive force is equal to the magnetomotive force of the main winding 1, which has a level of "+1". If the combined magnetomotive force caused by the currents in the main and auxiliary windings 1 and 2 is calculated over one period, it is not constant but is instead increased and decreased alternately as shown in FIG. 2B. That is, the combined magnetomotive force is increased and decreased twice in one period, thereby causing great vibration and noise at a frequency twice as high as the power source frequency and at its harmonic frequencies.

Figure 3A:
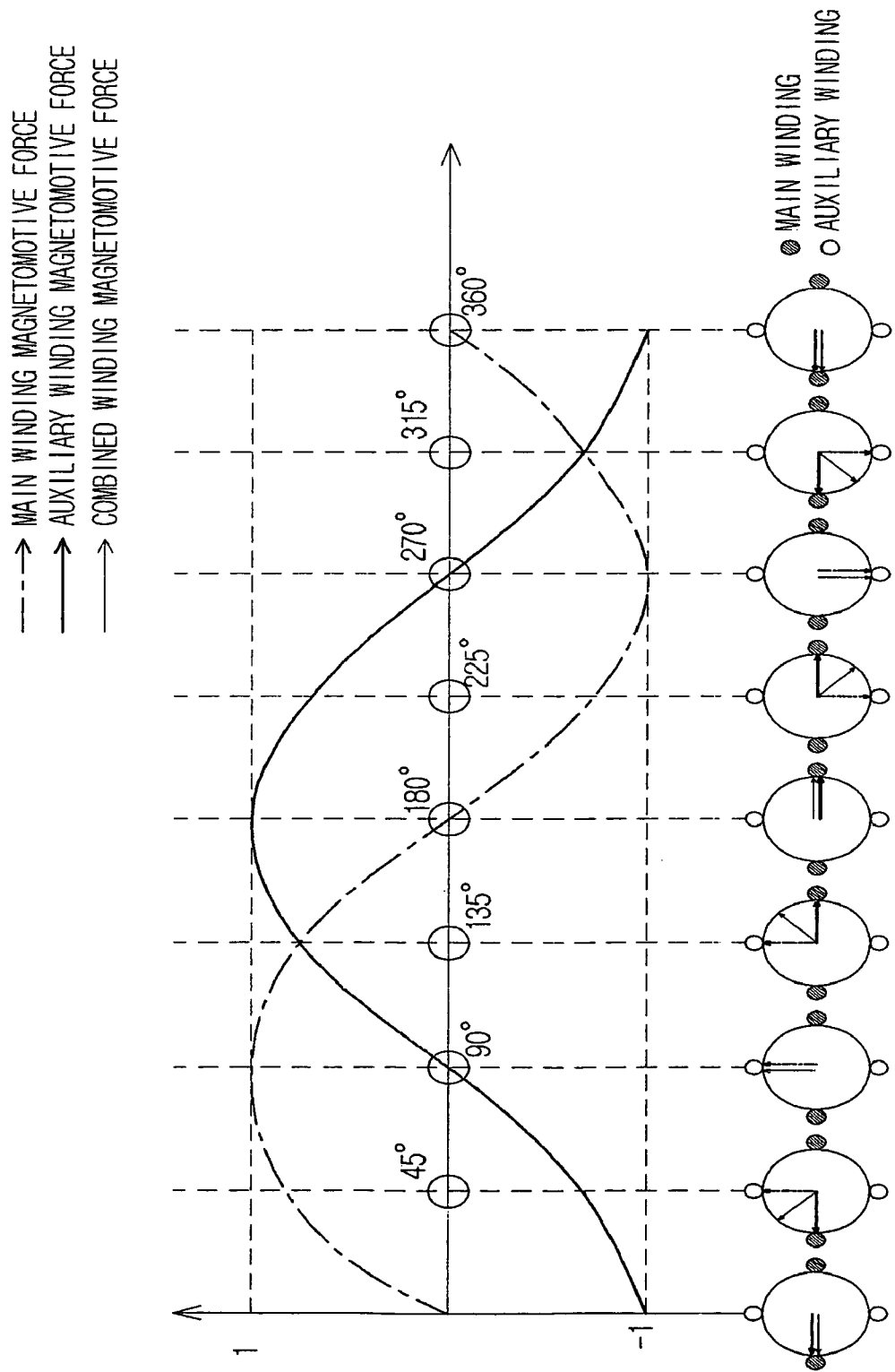
FIGS. 3A and 3B are diagrams illustrating the waveforms of currents flowing through the main and auxiliary windings and a corresponding distribution of magnetomotive forces produced by the main and auxiliary windings, respectively, when phase equilibrium is achieved in the single-phase induction motor shown in FIG. 1.
Figure 3B:
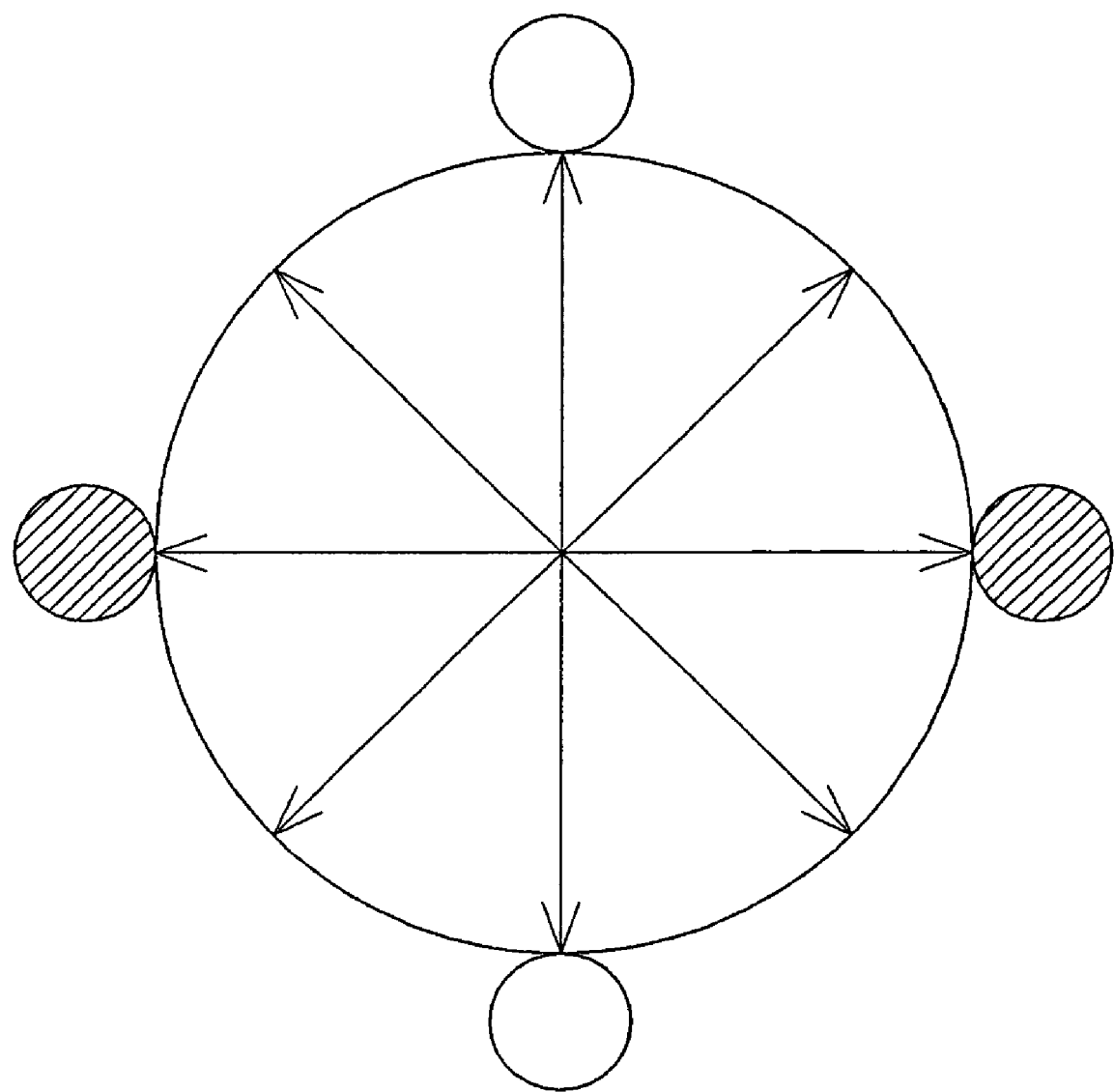

On the other hand, as shown in FIGS. 3A and 3B, phase equilibrium is achieved if the amplitude of the current flowing in the main winding 1 is equal to that of the current flowing in the auxiliary winding 2, and the phase difference between the two currents is maintained at 90 degrees. FIG. 3A shows the waveforms of currents flowing through the main and auxiliary windings 1 and 2 and a corresponding distribution of magnetomotive forces when phase equilibrium is established. When the current of the main winding 1 is zero in phase, only the current of the auxiliary winding 2 has a non-zero level of "−1", so that the combined magnetomotive force has a level of "−1". When the current of the main winding 1 is 90 degrees in phase, only the current of the main winding 1 has a non-zero level of "+1" so that the combined magnetomotive force has a level of "+1". If the combined magnetomotive force caused by the currents in the main and auxiliary windings 1 and 2 is calculated over one period, it is always constant in one period as shown in FIG. 3B. Accordingly, torque ripple proportional to a ripple in the combined magnetomotive force is eliminated, thus allowing the implementation of a low vibration, low noise single-phase induction motor 100.

In order to reduce vibration and noise in the single-phase induction motor 100, the currents "$I_m$" and "$I_a$" flowing in the main and auxiliary windings 1 and 2 in the stator must have the same amplitude and maintain the phase difference therebetween at 90 degrees, which is described below in more detail with reference to the backward magnetomotive force expressed in Equation (1).

The level of noise and vibration of the single-phase induction motor 100 depends on the backward magnetomotive force. The motor noise and vibration decreases as the level of the backward magnetomotive force component in the magnetomotive force of the stator windings expressed in Equation (1) decreases. As shown in Equation (1), the backward magnetomotive force is expressed by:

$$\tfrac{1}{\sqrt{2}}\{(N_m I_m - N_a I_a \sin\theta_a)\cos(\omega t+\theta)-(N_a I_a \cos\theta_a)\sin(\omega t+\theta)\}$$

which can be rewritten as follows:

$$\frac{1}{\sqrt{2}}\sqrt{(N_m I_m - N_a I_a \sin\theta_a)^2 + (N_a I_a \cos\theta_a)^2}\,\cos(\omega t + \theta + \alpha) \quad (2)$$

The amplitude of the torque ripple occurring in the single-phase induction motor 100 is proportional to the amplitude of the backward magnetomotive force expressed in Expression (2), i.e., proportional to the value of the term in the root of Expression (2).

Figure 4:
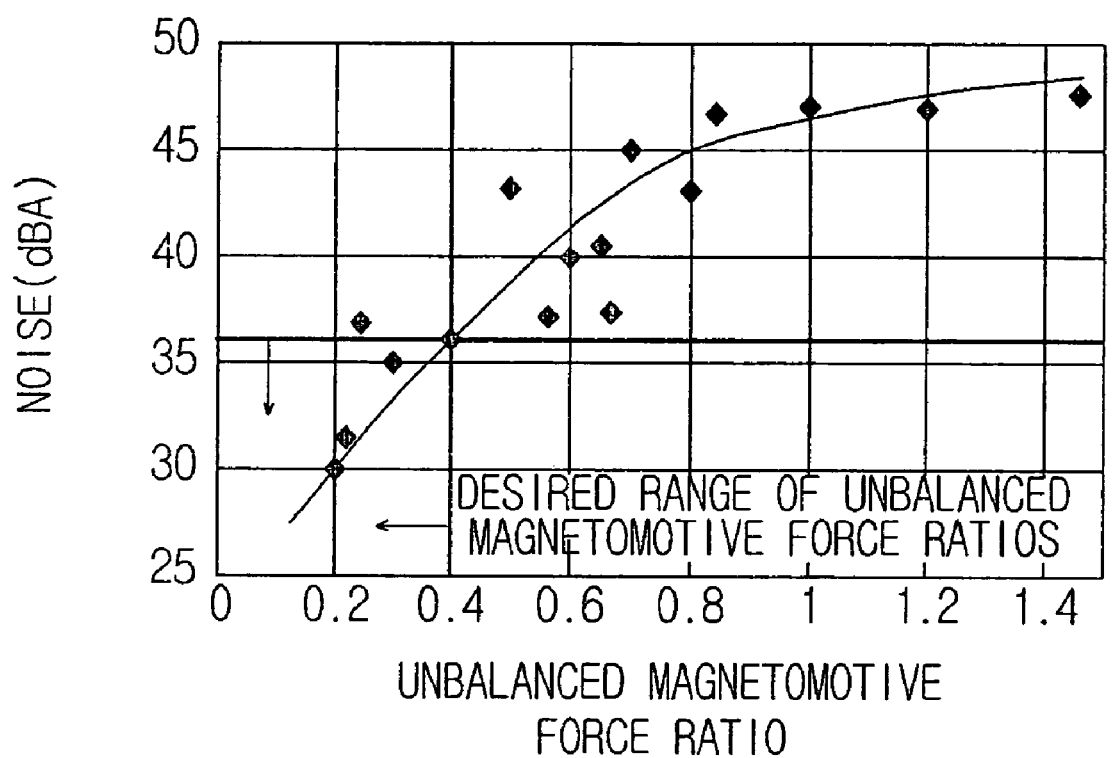
FIG. 4 is a graph illustrating how noise varies according to the degree of unbalance between magnetomotive forces in the single-phase induction motor shown in FIG. 1.

FIG. 4 is a graph illustrating the relationship between noise occurring in the single-phase induction motor 100 and the amplitude of the backward magnetomotive force. More specifically, this graph shows the change in the level of noise with respect to the degree of magnetomotive force unbalance (also referred to as an "unbalanced magnetomotive force ratio"). In this graph, the horizontal axis denotes the unbalanced magnetomotive force ratio, which is the ratio of the amplitude of backward magnetomotive force to the amplitude of magnetomotive force of the main winding 1. The vertical axis denotes the level of noise that occurs at a frequency twice as high as the power source frequency. The unbalanced magnetomotive force ratio must be maintained below 0.4 if allowable noise levels are set lower than 35 dBA, assuming that noise levels below 35 dBA do not generally annoy human beings.

Figure 5:
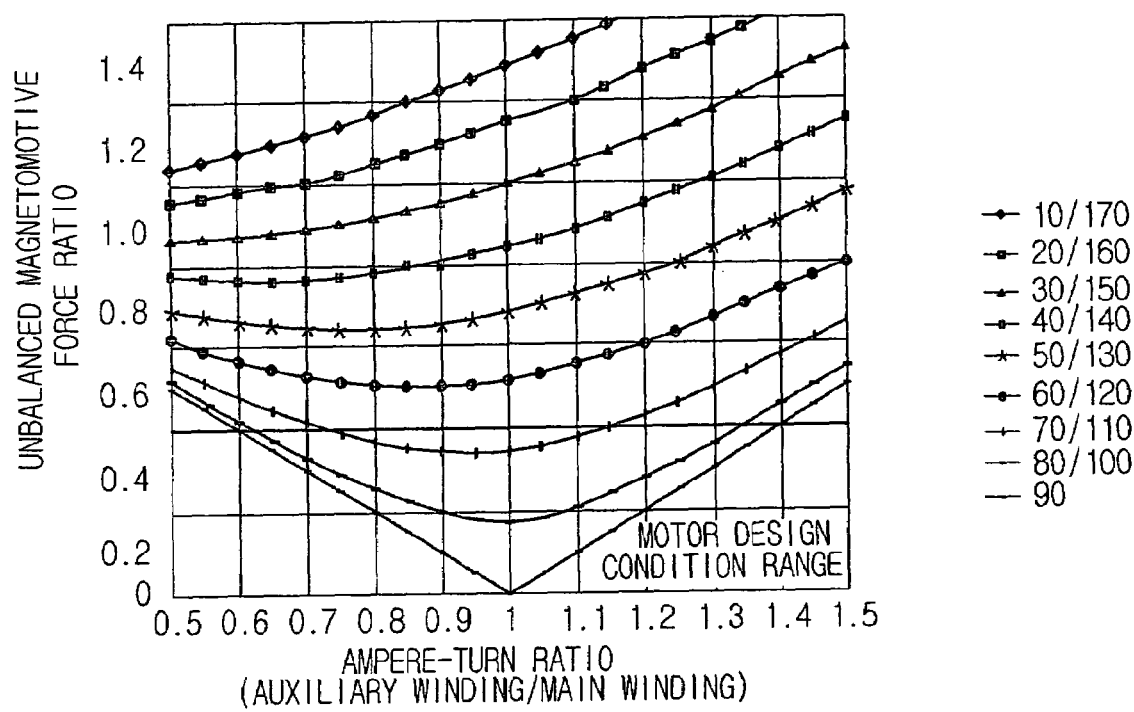
FIG. 5 is a graph showing unbalanced magnetomotive force ratio according to the phase angle difference and the ampere-turn ratio of the single-phase induction motor shown in FIG. 1.

Thus, there is a need to determine design conditions of the single-phase induction motor 100 which are required to maintain the unbalanced magnetomotive force ratio below 0.4, which is described below with reference to FIG. 5. FIG. 5 is a graph showing the unbalanced magnetomotive force ratio according to the phase angle difference of the main and auxiliary windings 1 and 2, with the horizontal axis denoting the ampere-turn ratio ($N_a I_a / N_m I_m$) (i.e., the magnetomotive force ratio) of the auxiliary winding 2 to the main winding 1 and the vertical axis denoting the unbalanced magnetomotive force ratio. It can be seen from FIG. 5, that, in order to maintain the unbalanced magnetomotive force ratio below 0.4, the phase angle difference must be maintained between 70 and 110 degrees, and the ampere-turn ratio must be maintained within a certain range according to each phase angle difference.

FIG. 6 is a table showing exemplary design conditions of the single-phase induction motor according to the graph of FIG. 5. As shown in FIG. 6, the ampere-turn ratio must be maintained between 0.75 and 1.15 when the phase angle difference of the main and auxiliary windings 1 and 2 is 70 degrees or 110 degrees, and it must be maintained between 0.65 and 1.35 when the phase angle difference is 80 degrees or 100 degrees. If the single-phase induction motor 100 is designed so as to satisfy these conditions, its noise and vibration is minimized.

The design conditions of FIG. 6 are set based on the entire running range (for example, the entire rpm range) of the single-phase induction motor, and also based on temperature increase of the motor as it runs, which allows a reduction in the noise and vibration of the motor in its entire running range.

As is apparent from the above description, the present invention provides a single-phase induction motor 100 and a method for reducing noise in the same, which has the following advantages. It is possible to eliminate unbalance between magnetomotive forces of main and auxiliary windings in a stator of the motor 100 by controlling the amplitude and the phase angle of a magnetomotive force produced by the auxiliary winding, relative to the amplitude and the phase angle of a magnetomotive force produced by the main winding, thereby implementing a low noise, low vibration single-phase induction motor 100.

In addition, it is possible to achieve balance between the magnetomotive forces of the stator windings in the entire running range of the motor 100, and also to achieve balance between the magnetomotive forces on the basis of temperature increase of the motor as it runs.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for reducing noise in a single-phase induction motor having a main-winding and an auxiliary-winding, the method comprising: maintaining a phase angle difference of the main winding and the auxiliary winding between 70 and 110 degrees; and maintaining an ampere turn ratio of the auxiliary-winding to the main-winding between 0.65 and 1.35, wherein the ampere turn ratio is a ratio of the auxiliary-winding magnetomotive force to the main-winding magnetomotive force.

2. The method according to claim 1, wherein the phase difference is maintained at 90 degrees.

3. The method according to claim 1, wherein if the phase angle difference is maintained at 70 or 110 degrees, the ampere turn ratio is maintained between 0.75 and 1.15.

4. The method according to claim 1, wherein if the phase angle difference is maintained at 80 or 100 degrees, the ampere turn ratio is maintained between 0.65 and 1.35.

5. The method according to claim 1, wherein the noise is reduced to 35 dBA or lower.

6. The method according to claim 1, wherein the amplitude of a main-winding current flowing through the main winding in the stator is equal to the amplitude of an auxiliary-winding current flowing through the auxiliary winding in the stator.

7. A single-phase induction motor comprising:
   a main winding in a stator; and
   an auxiliary winding in the stator, the auxiliary winding being connected in parallel with the main winding,
   wherein a phase difference between a main-winding current flowing through the main winding and an auxiliary-winding current flowing through the auxiliary winding is maintained between 70 and 110 degrees,
   wherein a ratio of a main-winding magnetomotive force produced by the main winding and an auxiliary-winding magnetomotive force produced by the auxiliary winding is maintained between 0.65 and 1.35.

8. The motor according to claim 7, wherein the phase difference is maintained at 90 degrees.

9. The motor according to claim 7, wherein if the phase difference is maintained at 70 or 100 degrees, the ratio of the main winding magnetomotive force and the auxiliary winding magnetomotive force is maintained between 0.75 and 1.15.

10. The motor according to claim 7, wherein if the phase difference is maintained at 80 or 100 degrees, the ratio of the main winding magnetomotive force and the auxiliary winding magnetomotive force is maintained between 0.65 and 1.35.

* * * * *